(12) United States Patent
Larson et al.

(10) Patent No.: US 9,067,352 B2
(45) Date of Patent: Jun. 30, 2015

(54) SYSTEM AND PROCESS FOR SHOT-INJECTION MOLDING AN EYEGLASS TEMPLE WITH A WIRE CORE

(71) Applicant: Charles P. Larson, Redmond, OR (US)

(72) Inventors: Charles P. Larson, Redmond, OR (US); Adrien Jean Didier Rougier Lagane, Floreal (MU)

(73) Assignee: OPTIMEYES4U, INC., Redmond, OR (US)

( * ) Notice: Subject to any disclaimer, the term of this patent is extended or adjusted under 35 U.S.C. 154(b) by 99 days.

(21) Appl. No.: 13/967,778

(22) Filed: Aug. 15, 2013

(65) Prior Publication Data

US 2015/0049295 A1     Feb. 19, 2015

(51) Int. Cl.
| | |
|---|---|
| B29C 45/16 | (2006.01) |
| B29C 45/14 | (2006.01) |
| B29D 12/02 | (2006.01) |
| B29C 45/72 | (2006.01) |
| G02C 5/18 | (2006.01) |
| B29L 12/00 | (2006.01) |

(52) U.S. Cl.
CPC ..... B29C 45/14032 (2013.01); *B29L 2012/005* (2013.01); B29C 45/1642 (2013.01); B29D 12/02 (2013.01); *B29C 2045/1696* (2013.01); B29C 45/14549 (2013.01); B29C 45/7207 (2013.01); G02C 5/18 (2013.01); *G02C 2200/10* (2013.01)

(58) Field of Classification Search
CPC .......... B29C 45/14336; B29C 45/14754; B29C 2045/1477; B29C 45/14778; B29C 45/4457; G02C 2200/16; G02C 5/06; G02C 5/16

USPC ................ 264/453, 239, 250, 260; 148/563
See application file for complete search history.

(56) References Cited

U.S. PATENT DOCUMENTS

| | | | |
|---|---|---|---|
| 3,155,763 | A | 11/1964 | Thorn et al. |
| 3,666,355 | A | 5/1972 | Griffith |
| 5,054,903 | A | 10/1991 | Jannard et al. |

(Continued)

FOREIGN PATENT DOCUMENTS

| | | |
|---|---|---|
| FR | 2655162 B3 | 6/1992 |
| GB | 1074013 A | 6/1967 |
| JP | 2008077021 A | 4/2008 |

*Primary Examiner* — Hung Dang

(74) *Attorney, Agent, or Firm* — Ice Miller LLP

(57) ABSTRACT

A system and process for making an eyeglass temple co-injection molded with a wire core are disclosed. An eyeglass temple is produced by injecting a first shot of temple substrate material into a mold followed by the shot injection of a portion of wire core into the substrate material while it is still molten or semi-molten followed by a second shot injection of additional molten or semi-molten material to completely fill the mold. The first shot of template substrate is provided in a viscosity and amount sufficient to support the wire core without contact by the mold or external support, and the second shot is provided in an amount sufficient to completely fill and pack the mold and lessen shrinkage problems during substrate cooling and hardening. This produces an eyeglass temple in a desired configuration having an entirely encased wire core. Optionally, a second material can then be over-molded onto portions of the temple. The first material and reinforcing core allow greater adjustability and increased comfort for the wearer, while the second material can either be softer to provide a more comfortable fit and feel or can be similar to the first material to improve the temple's aesthetics.

20 Claims, 6 Drawing Sheets

(56) References Cited

U.S. PATENT DOCUMENTS

| | | |
|---|---|---|
| 5,249,001 A | 9/1993 | Jannard |
| 5,610,669 A | 3/1997 | Kuipers et al. |
| 5,708,491 A | 1/1998 | Onodera et al. |
| 6,598,969 B2 | 7/2003 | Asano |
| 6,911,172 B2 * | 6/2005 | Swab et al. ............ 264/250 |
| 7,055,952 B2 | 6/2006 | Fecteau et al. |
| 7,490,934 B2 | 2/2009 | Yasuhara et al. |
| 7,543,932 B1 | 6/2009 | Isabelle et al. |
| 7,758,789 B2 * | 7/2010 | Curci et al. ............ 264/255 |
| 7,878,647 B2 | 2/2011 | Hardy |

* cited by examiner

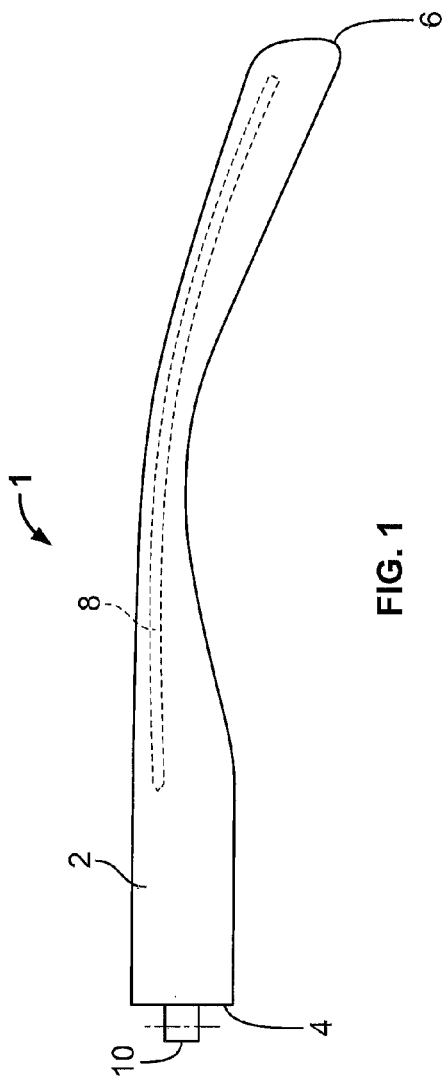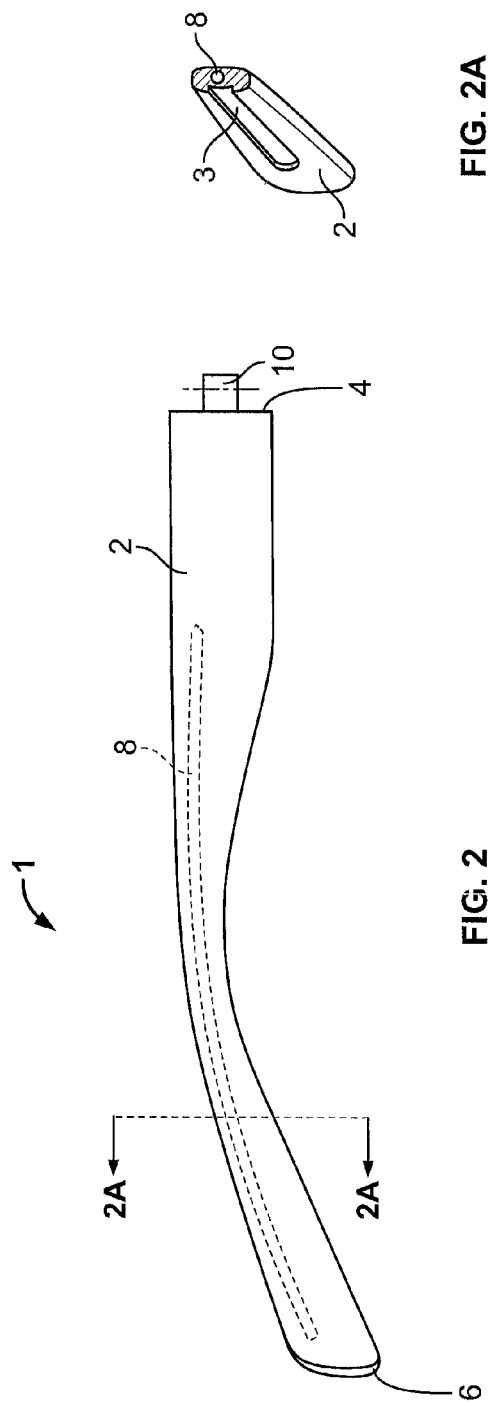

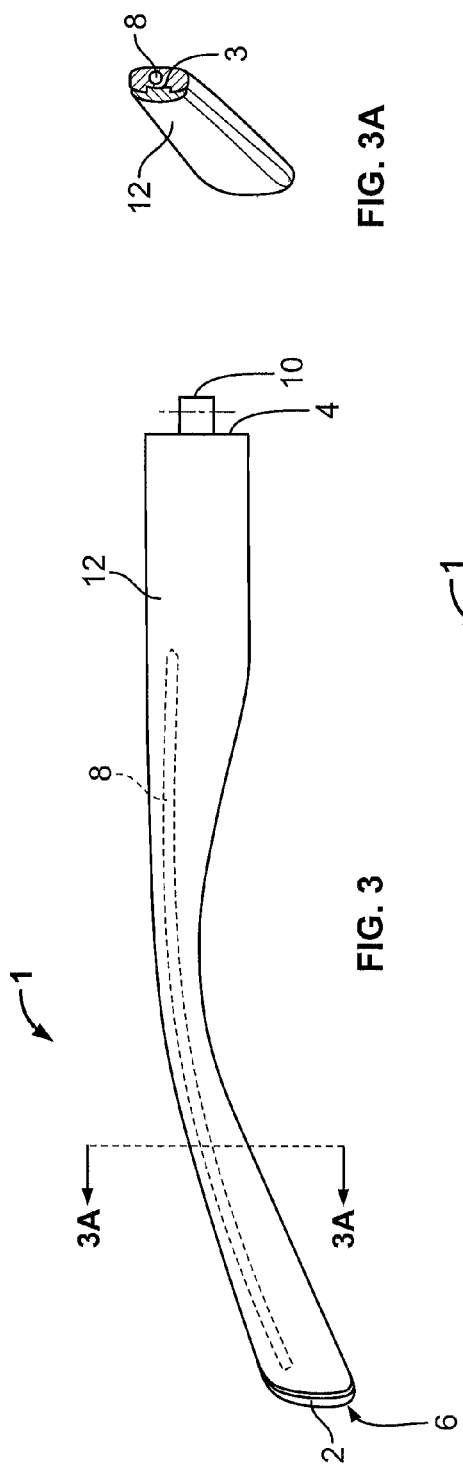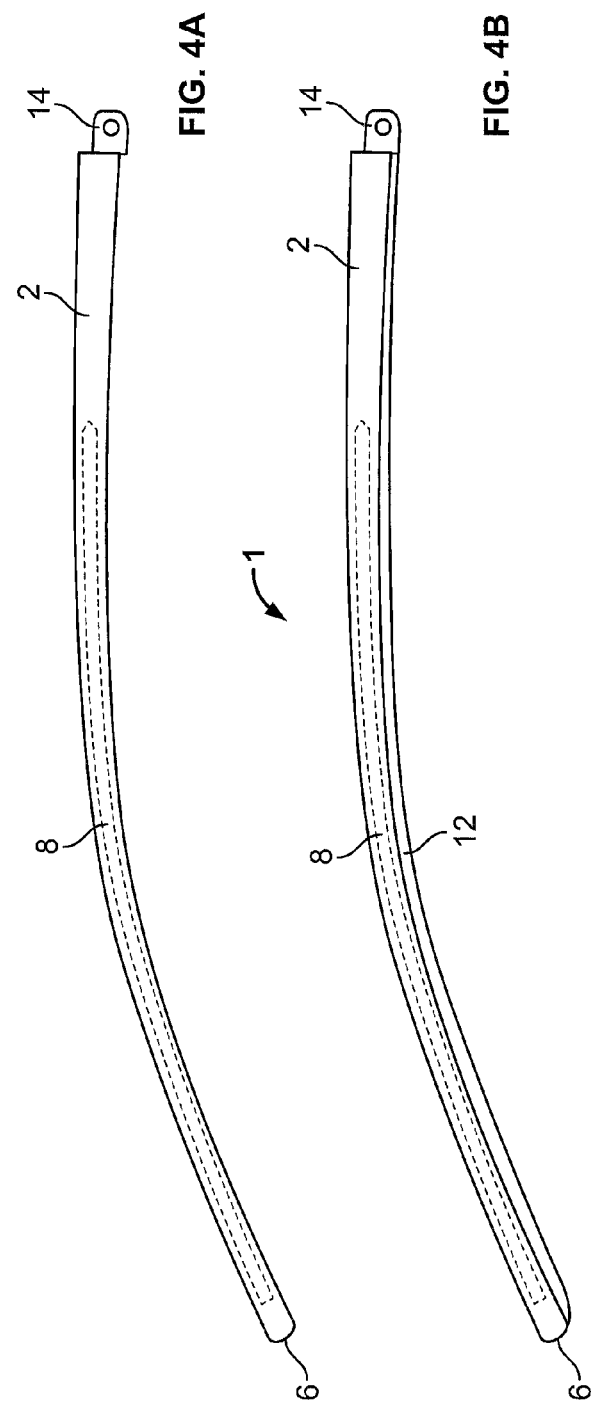

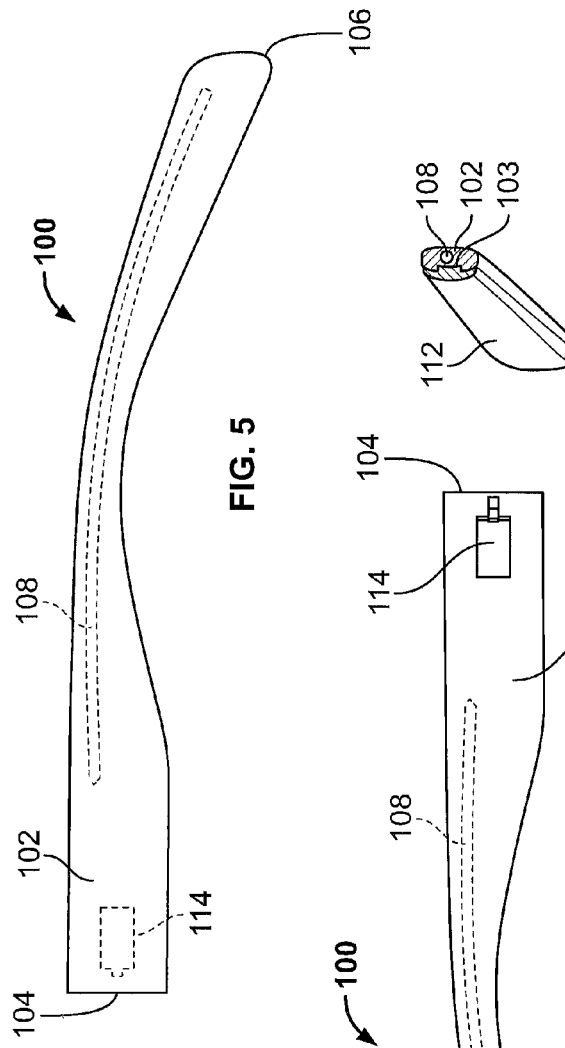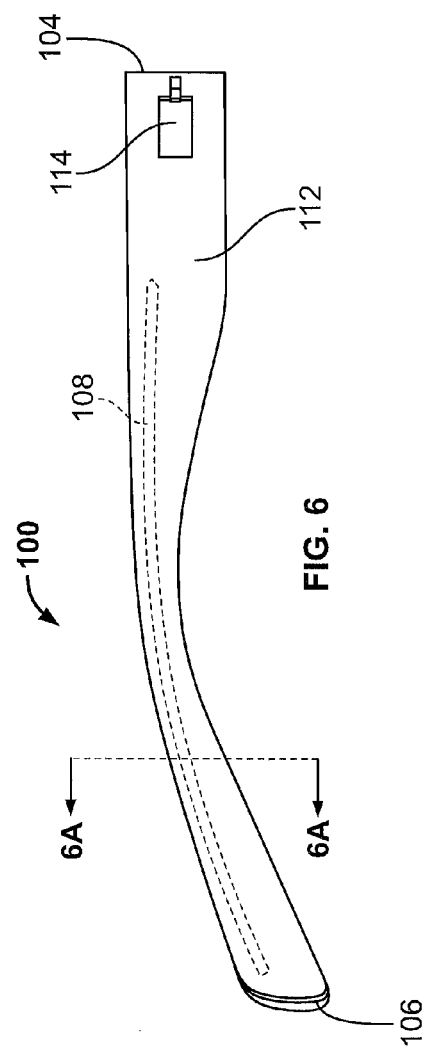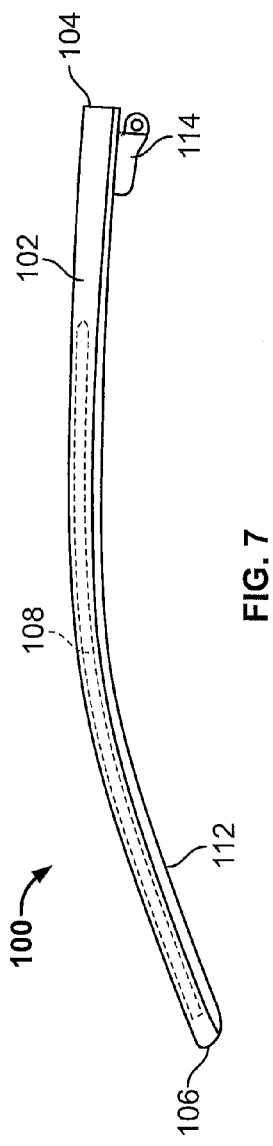

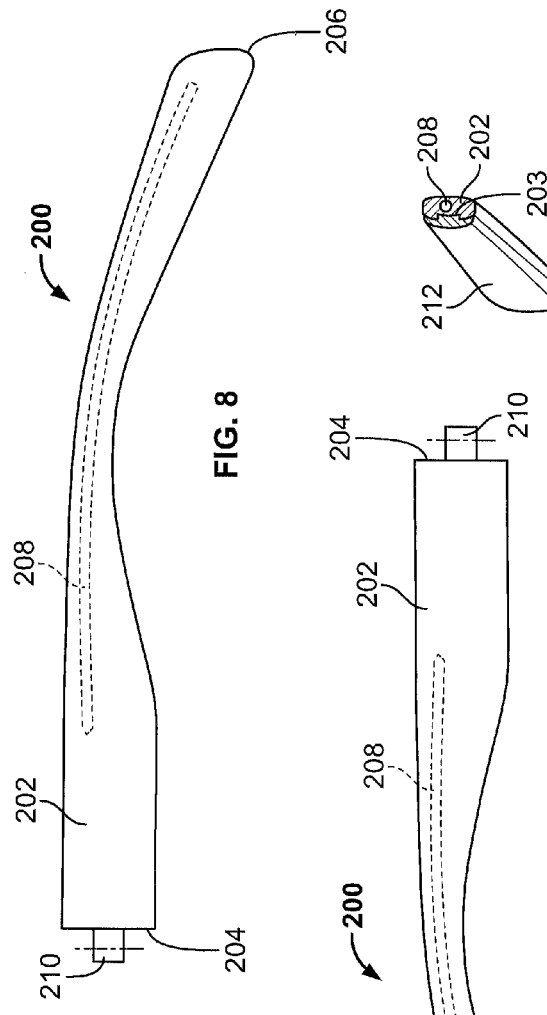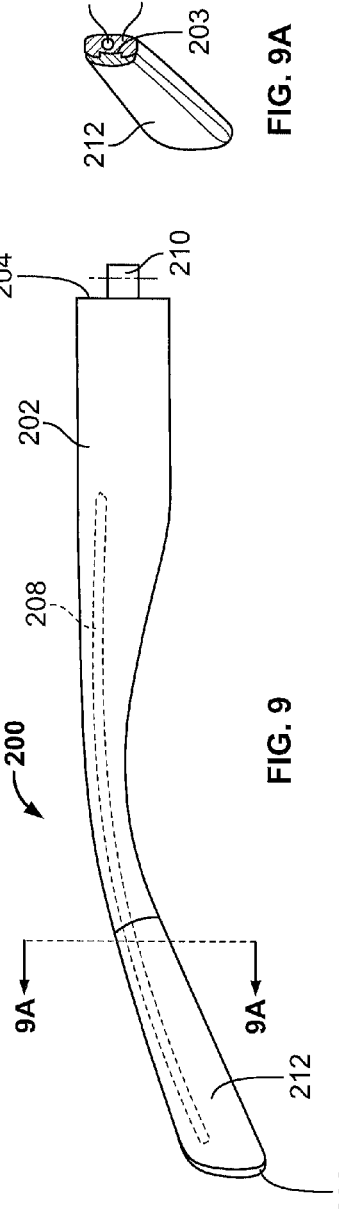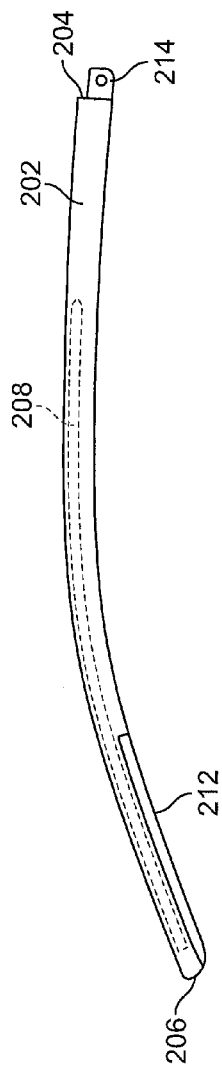

SYSTEM AND PROCESS FOR SHOT-INJECTION MOLDING AN EYEGLASS TEMPLE WITH A WIRE CORE

FIELD OF THE INVENTION

The present invention is directed to a system and process for making eyeglass or sunglass temples produced by shot-injecting a wire core into a mold containing a molten material, such as plastic or nylon, so that the wire core is encased in the material. The resulting temple having an encased wire core is optionally next placed into a second mold to have a second material, such as nylon or rubber, overmolded on a portion of the temple to make a comfortable, pliable, but rigid temple. This results in a two material temple that has an encased wire core.

BACKGROUND OF THE INVENTION

A system and method for making improved eyeglass temples by shot-injection molding a hard, thermoplastic material or other temple substrate materials with an enclosed reinforcing wire core are disclosed. The resulting eyeglass temples are firm and rigid, providing necessary stability while remaining pliable enough to be adjusted without the use of heat. The wire core is entirely encased by the temple material and helps the temple keep the shape that it has been adjusted to during patient fitting of the eyewear, even in hot temperatures, which can cause traditional temples to lose their shape. The shot-injection process includes partial filling of the mold with a first shot of the temple substrate material in a molten condition. The first shot is provided in an amount and viscosity that accommodates a first portion of the wire core and maintains the entire core in a desired position within the mold and material but without contacting the mold or other support. The wire core is then shot-injected into the material within the mold in a desired position that is maintained by contact of the first portion of the core with the material and without need for contact with the mold or external supports. The first shot amount of molten temple substrate material is also selected to permit displacement of the material during the shooting process but is also selected to avoid waste of the substrate by overflow during the shooting of the wire core. A second shot of temple substrate material is supplied in an amount sufficient to completely fill the mold to surround and encase the remaining portion of the wire core, bringing the material into close contact with the surface of the wire core. This second shot can also be selected to provide sufficient additional material to avoid undesirable shrinkage deformation of the finished temple during cooling. Additionally, the disclosed shot-injection molded reinforced temple can be at least partially coated with a second material in a second injection molding process, known as overmolding. The use of a second material, such as nylon, provides additional design options not available for temples that are not overmolded. The overmolding of a second, softer material onto the harder plastic improves a wearer's comfort by allowing for a more protective and comfortable fit and feel of the temple against the wearer's head. The wearer's comfort can be further improved by strategically placing the second material on the interior surface of the temple that rests against a wearer's head. Thus, the second material can either increase the aesthetic value of the temple and/or the gripping action of the temple. Further, the second material can be dyed or tinted different colors to improve the design of the temple by creating either a dual color or single color temple.

Plastic eyeglass temples having a wire core to reinforce and stabilize the temple are well known in the industry. As mentioned previously, the wire core allows the temple to be adjusted to more comfortably fit along a wearer's head and behind the ears. Generally, an Eye Care Professional (ECP) adjusts the temples of a pair of eyeglasses to fit the wearer. This is typically done by warming and molding the shape of the temple to create a better fit. Unlike temples without a wire core, plastic temples with a wire core will not lose their shape when the temple is warmed, such as by being left in a car on a warm day.

Plastic eyeglass temples have been produced in a variety of different manners. Milling has traditionally been used to produce temples made from acetate. The resulting milled temples can have a wire core manually pressed or ultrasonically embedded into the temple. This is usually accomplished by placing the milled temple flat, warming the temple, and pushing a wire core sideways along its longitudinal axis into the temple. The wire core can also be laminated into the temple by sandwiching the core between two preferred temple portions and then heating the portions until they form around the core and join together.

Another method for producing eyeglass temples is by injection molding, which is generally used to produce plastic or nylon temples, sunglass frames and sunglass frame parts. Such injection molding usually involves molding a temple in a single plastic material. One known method used to include a wire core in the temple requires placing the entire wire core in the temple mold prior to injection of the desired material into the mold. This is also referred to as insert molding. Positioning of the wire core during traditional injection molding is problematic in that the core has to be maintained in its desired position by some form of contact support means provided by the mold or externally, which makes it difficult if not impossible to completely surround the wire core with molten temple substrate material without creating some gaps in the temple material and/or other molding defects such as sink marks or bubbles.

Metal eyeglass temples are also known in the art. Although metal temples are durable, they present wearer comfort issues, particularly where the end portion of the metal comes into contact with the wearer's ears and/or along the wearer's temple and head. The art has attempted to address such comfort issues by cladding the ear end portion of metal temples with an end piece made from plastic or rubber. For example, Yashahara et al. U.S. Pat. No. 7,490,934 discloses an end piece for a metal eyeglass temple formed about the ear end portion of the metal temple. The end piece comprises a central flexible member such as an elastomeric rubber located between two hard end members formed in an integral manner at each end of the flexible member. The metal temple's ear portion is inserted into the end piece through an insertion hole extending inside and between the hard end members and the central flexible member. Insert molding is disclosed as one method of integrally forming the two hard end members into the flexible member portion of the ear piece. Use of such hard members is disclosed or necessary to present rotation of the flexible end piece around the axial core provided by the wire temple. This approach leaves a portion of the metal temple uncovered by the flexible or hard members.

Asano U.S. Pat. No. 6,598,969 discloses another method for making end pieces for metal eyeglass temples with the metal temple serving as the core of the end piece. The disclosed end pieces comprise two plastic materials, an end piece substrate material and a relatively softer end piece cover material. The end piece is formed by conventional injection-molding, press-molding or cast-molding. The end piece substrate and cover material are formed in advance and joined by adhesives or heat-welding, or the cover material is injection molded over the substrate. Alternatively, the end portion of the metal temple is used in insert-molding or shooting molding into the substrate layer and, after the substrate layer solidifies, the cover material is applied to the substrate. This leaves a portion of the metal template unclad by either substrate or cover material.

The use of entire metal temples partially clad with end pieces disclosed in the above-mentioned prior art is also disadvantageous in that the eyeglass frame weight is increased by that combination over metal-only temples.

More recently, Hardy U.S. Pat. No. 7,878,647 sought to overcome some of those problems by use of plastic eyeglass temples comprising a receiver portion and an ear piece portion formed from two different plastic materials. A cavity is provided within the receiver portion within which the proximal end of the pliant support member (wire core) is located. The flexible ear piece portion can be formed by molding around the cavity end of the receiver and the wire core. The disclosed methods involve providing a mating portion on the receiver that is surrounded by the flexible ear piece material during subsequent molding of the flexible ear piece portion onto the receiver portion.

Hardy's plastic temple and methods for making them thus includes complicated features and steps, including the need to correctly position the flexible wire core within two different materials during molding, the use of two temple materials, and use of special mating portions pre-formed on the receiver end of the temple. The ear piece portion of Hardy's temple is also constructed entirely of flexible material, causing a necessary but lesser desired compromise between the need to use softer materials for the ear piece portion to provide greater user comfort at the expense of sacrificing better fitting shape retention qualities provided by harder temple materials.

There is therefore a need in the art for reinforced plastic eyeglass temples that provide improved wearer comfort without sacrificing fitting and shaping of the temple to the individual wearer, and simplified methods for their manufacturer.

SUMMARY OF THE INVENTION

A process for producing a shot-injection molded reinforced eyeglass temple is disclosed comprising providing a mold for an eyeglass temple, and injecting a first shot of a molten template substrate material in an amount and viscosity sufficient to partially fill the mold and sufficient to support a selected wire core solely within the material and not in contact with the mold or other support. Next, a wire core is shot-injected into the mold and the molten template substrate material so that a first portion of the wire core extends into and is supported in a desired position within the mold solely by the molten temple substrate material. A second shot of the molten temple substrate material is injected to completely fill the mold and completely surround the wire core, bringing the material into close contact with the entire surface of the wire core. The molten temple substrate material containing the wire core is cooled and the molten temple substrate material is allowed to solidify. An eyeglass temple having an entirely encased wire core is removed or ejected from the mold. Excess material can be removed from the eyeglass temple and the temple can be polished. The eyeglass temple can also be coated with a varnish. The first shot of the material for partially filling the mold is preferably between about 40% to about 90% of the mold's capacity, and more preferably from about 60% to about 80% of the mold's capacity.

In an embodiment, the process further comprises providing a second mold for overmolding a second material on a portion of the eyeglass temple, providing the eyeglass temple into the second mold, injecting a shot of the second material to fill the second mold, allowing the second material to cool and solidify, and removing from the second mold an eyeglass temple having an encased wire core that is partially overmolded with the second material. Preferably the second material has a lower Shore Hardness than the temple substrate material.

A system for shot-injection molding an eyeglass temple and a wire core is disclosed comprising an eyeglass temple mold, an injection molding system and a wire core shot-injection system. The injection molding system accepts and holds the mold in a position for injection of molten temple substrate material into the mold. Preferably the mold has a first half and a second half and the injection molding machine comprises a stationary platen on which the first half of the mold is mounted, a moveable platen on which the second half of the mold is mounted and slides or other means whereby the second half of the mold can be moved into contact with the first mold half to provide a closed mold. The injection system provides at least a first shot and a second shot of a molten temple substrate material into the mold. The injection system comprises a temple substrate supply system for supply of raw substrate to a heating system, a temple substrate heating system for heating of the supplied substrate into a molten condition, means for injecting the molten temple substrate material into the mold in at least a first shot portion and a second shot portion, and means for cooling the temple substrate material after the second injection to form the reinforced wire core template. The means for injection of substrate into the mold preferably comprises a tube or nozzle that directs molten substrate from the heating system into the mold through a passage or channel in the mold. The means for cooling the injected substrate within the mold can comprise air or gas or liquid cooling systems such as room temperature cooling, fans, radiators, cooling baths or streams of liquid or mechanical refrigeration systems. The system also comprises an auxiliary wire core shot-injection system positioned adjacent the mold. The auxiliary system comprises a wire core feeding system having at least one passage for accepting a wire core and means for shot-injection of the wire core into the mold and into the first shot of molten substrate. The shot-injection system can inject the wire core into the mold by using a portion or all of the same channel or passage in the mold that is used to supply molten temple substrate into the mold or by use of a separate passage in the mold. Preferably a separate passage is used for wire core injection, one which runs roughly parallel to the longitudinal axis of the temple to assist the positioning of the wire core along the temple. The use of a separate channel facilitates wire core injection without the need for cleaning of the passage to remove residual substrate that may coat the passage walls during first shot injection. The auxiliary system preferably comprises at least one pin that fits inside its wire core passage, and a hydraulic cylinder for driving the pin against the wire core and into the mold and the first portion of molten temple substrate material already present in the mold and for withdrawing the pin from the mold during or after second shot injection of molten temple substrate into the mold. It is contemplated that other means for shot-injection of the wire core could be employed, such as expanding air or gas systems, or mechanical systems such as rollers that grab and rapidly advance and then release the wire core. The wire core and amount and the viscosity of first shot of molten temple substrate material are selected and the auxiliary system positioned so that shot-injection of the wire core into the mold and the first shot of the molten temple substrate material places the wire core within the material to support the core without contact between the core and mold or other external supports then and during injection of the second shot of the molten temple material. The second shot of molten temple substrate material completely fills the mold and brings the temple material into close contact with the entire surface of the wire core and encloses the core within the material. Cooling of the completely filled mold is accomplished by permitting the mold to reach room temperature by thermodynamic equilibrium, or accelerated by use of mechanical cooling devices such as fans, cooling liquids or gases or refrigeration systems. Although the cooled temple can be removed by the mold by hand, the injection system preferably comprises an ejection system to assist removal of the cooled, solidified reinforced wire core eyeglass temple from the mold. The ejection system can be made part of the mold as a moveable portion, such as a lever or ramp or other mechanical means for lifting or separating the temple from the mold, or can be supplied on the injection machine in the form of well-known mechanical means for lifting and separating molded pieces from molds.

In another embodiment, the system further comprises a second mold having a cavity configured to accept at least a portion of the reinforced eyeglass temple and configured for overmolding a second material on a portion of the reinforced eyeglass temple and a second injection molding machine for injecting the second material into the second mold and onto the eyeglass temple. The system also comprises means for manual removal of the overmolded temple or, more preferably, a second ejection to eject the reinforced eyeglass temple partially overmolded with the second material from the second mold.

A process for producing an eyeglass temple molded with a reinforcing encased wire core is also disclosed comprising providing a first mold having a first half and a second half and an injection molding machine. The injection molding machine comprises a stationary platen on which the first half of the first mold is mounted and a moveable platen on which the second half of the first mold is mounted, an injection system, an auxiliary system and an ejection system. Movement of the platen holding the second half of the mold is employed to bring both mold halves in contact and to close them together, creating a mold cavity that is configured to provide the desired shape temple. A first temple substrate material is then fed into the injection system, which heats the substrate until it becomes molten. The molten first temple substrate material is injected into the closed first mold using the injection system to provide a first shot of material sufficient to partially fill the first mold, preferably to about 40% to about 90% of the mold's capacity. A wire core is then shot-injected into the first mold and the temple substrate material using the auxiliary system which is preferably mounted on the stationary platen of the injection molding machine so that a first portion of the core enters and penetrates substantially within the substrate material but does not penetrate entirely through all of the material to the side of the mold. Instead, the first portion is positioned within the molten temple substrate material at a depth such that it is supported in the material at a desired position without contact with the mold or other external support. After the wire core injection, a second shot of additional molten temple substrate material is injected into the first mold containing the wire core using the injection system to completely fill the first mold, bringing the injected material into direct contact with the surface of the wire core and completely encasing the wire core within the material. The molten first temple substrate material containing the wire core is allowed to cool and solidify or subjected to accelerated cooling by forced air or other mechanical or liquid cooling or by refrigeration. The first mold is then opened by separating the first half and second half of the first mold from each other; and a temple containing an entirely encased reinforcing wire core is removed either manually or by using an ejection system mounted on the injection molding machine. Preferably the ejection system is mounted on the moveable platen so that movement of the platen to open the mold can also be employed to eject the finished temple. Any excess material remaining on the temple can be removed by grinding, cutting or other well-known means. The temple can also be polished.

In an embodiment, after a temple containing a substantially encased wire core is produced, the temple is inserted into a second mold designed for overmolding a second material on at least a portion of the surface of the temple. The second mold is mounted on an injection molding machine comprising an injection system and an ejection system. The second material is then fed into the injection system and heated until it becomes molten. Next, the second material is injected into the second mold to bring the material into contact with at least a portion of the surface of the temple. The second material is allowed to cool and solidify. A temple containing an encased wire core that is at least partially overmolded with the second material is then removed by hand or mechanically ejected from the second mold. The second material can be selected so that it has a lower Shore Hardness than the first temple substrate material and provides a different, preferably softer feel to the eyeglass wearer. Preferably the first temple substrate material has a Shore Hardness D of between about 80 and 85 and the second material has a Shore A Hardness of between about 60 and 70.

BRIEF DESCRIPTION OF THE DRAWINGS

FIG. 1 is a side view of the exterior of a temple injection molded with a reinforcing wire core according to an embodiment of the present invention.

FIG. 2 is a side view of the interior of a temple injection molded with a reinforcing wire core according to an embodiment of the present invention and FIG. 2A is a sectional side view across Section A-A of FIG. 2 showing a trough that may be provided in the interior sidewall of the temple.

FIG. 3 is a side view of the interior of a temple injection molded with a reinforcing wire core according to an embodiment of the present invention that has been overmolded with a second material, and FIG. 3A is a sectional side view across Section A-A of FIG. 3 showing the overlayed second material occupying a trough portion of the temple.

FIG. 4A is a top view of a temple co-injection molded with an encased wire core according to an embodiment of the present invention.

FIG. 4B is a top view of a temple co-injection molded with an encased, reinforcing wire core according to an embodiment of the present invention that has been overmolded with a second material.

FIG. 5 is a side view of the exterior of a temple co-injection molded with a wire core according to an alternative embodiment of the present invention.

FIG. 6 is a side view of the interior of a temple injection molded with an encased, reinforcing wire core according to an alternative embodiment of the present invention that has been overmolded with a second material, and FIG. 6A is a sectional view taken across Section A-A of FIG. 6 showing the overmolded layer occupying a trough provided in the side of the temple.

FIG. 7 is a top view of a temple injection molded with an encased, reinforcing wire core according to an alternative embodiment of the present invention that has been overmolded with a second material.

FIG. 8 is a side view of the exterior of a temple injection molded with an encased reinforcing wire core according to a further alternative embodiment of the present invention.

FIG. 9 is a side view of the interior of a temple injection molded with an encased reinforcing wire core according to a further alternative embodiment of the present invention that has been overmolded with a second material, and FIG. 9A is a section view taken across Section A-A of FIG. 9 showing the overmolded layer occupying a trough located in the side of the temple.

FIG. 10 is a top view of a temple injection molded with an encased reinforcing wire core according to a further alternative embodiment of the present invention that has been overmolded with a second material.

DETAILED DESCRIPTION OF THE INVENTION

Figure 11:
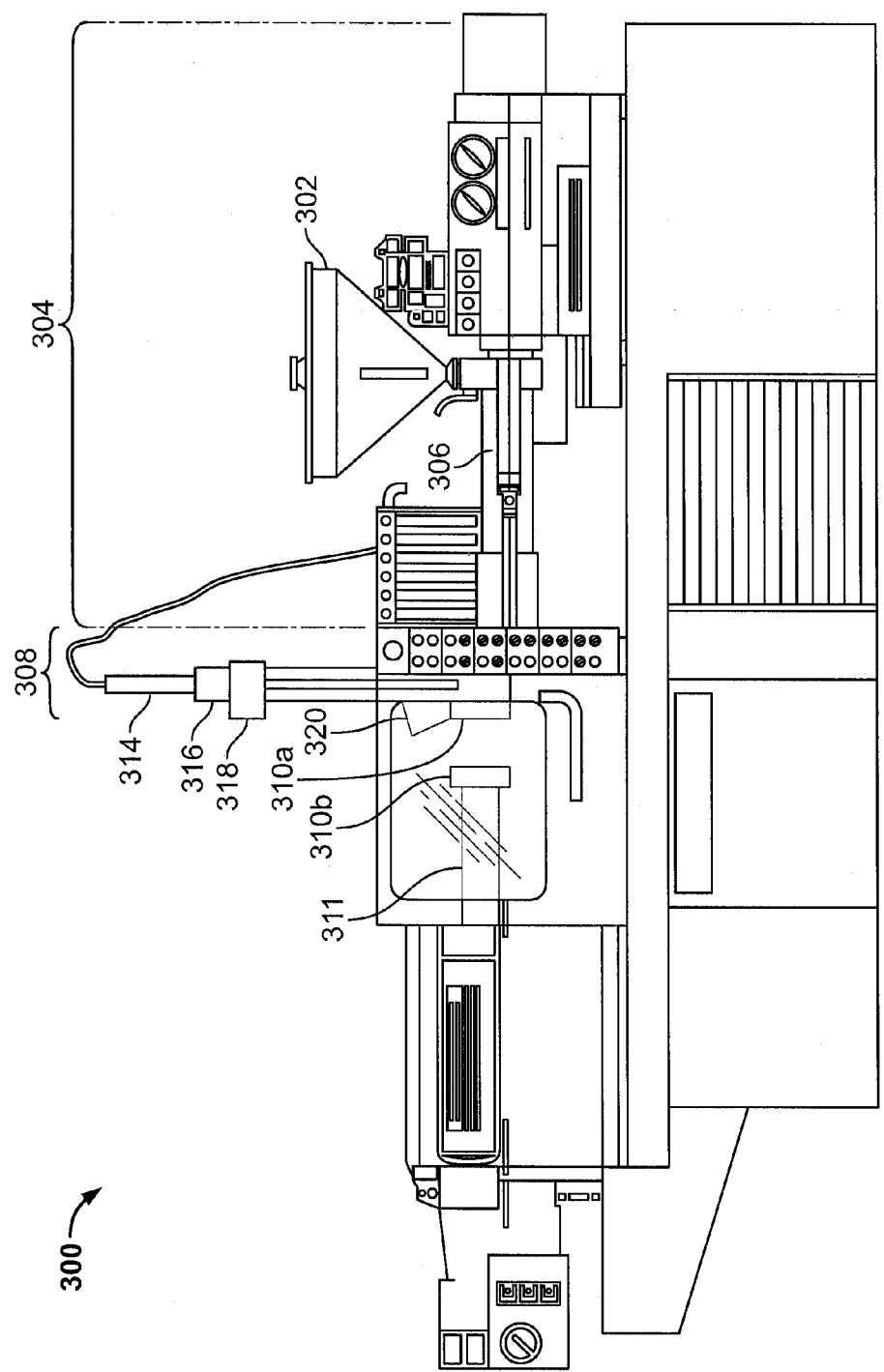
FIG. 11 is a side view of an injection molding machine having an auxiliary system.

FIGS. 1 and 2 show an eyeglass temple 1 according to the present invention injection molded with a reinforcing internal wire core 8, having a temple end portion 4 and a temple ear tip portion 6. The temple is made of a first temple substrate 2 that surrounds and encases internal reinforcing wire core 8. The temple also has an integrated hinge 10 affixed to end portion 4. Hinge 10 is preferably made of plastic. FIG. 1 shows the exterior side surface of temple 1 and FIG. 2 shows the interior side surface that is in contact with the wearer's ear and head.

Many types of temple substrate materials well known in the art can be used in the injection molding process to create the disclosed temple, such as polymers, including thermoplastics, some thermosets, and some elastomers. The selection of a substrate material for creating temples shot-injection molded with a reinforcing wire core is based both upon the desired characteristics of the final temple, such as fitting of the temple by bending to accommodate the wearer's ears and head, retention of the fitted temple shape, and the processing parameters of the shot-injection process. Different materials have different properties that affect the strength and function of the final part and also dictate the processing parameters, including the injection temperature, injection pressure, mold temperature, molten substrate viscosity, ejection temperature, and cycle time.

As mentioned above, thermoplastics are suitable for use in injection molding. Thermoplastics, also known as thermo softening plastic materials, become pliable or moldable above a specific temperature and return to a solid state upon cooling. Most thermoplastics have a high molecular weight and molecular chains that associate through intermolecular forces that will spontaneously reform upon cooling, allowing thermoplastic materials to be remolded. Another material that can be used in shot-injection molding is a thermosetting polymer. Unlike thermoplastics, thermosetting polymers form irreversible chemical bonds during the curing process that break down upon melting and do not reform upon cooling.

Another important feature of the substrate materials used for the disclosed temples is the hardness of each material, which is important to retain adjustability, strength and comfort. In one presently preferred embodiment, the temple substrate material shot-injection molded with a wire core, also referred to as the first material, and the material that can be overmolded on the temple, also referred to as the second material, have different Shore Hardness. Shore Hardness is measured using a Durometer, the International Standard Instrument used to measure the hardness of rubber, rubber-like materials or plastics. Durometers measure hardness by the penetration of an indentor into the rubber/plastic sample. The calibrated reading is expressed in a number value. The hardness values are always expressed in terms of plus or minus (+/−) five points (example: 60+/−5 Durometer). There are 3 Durometer types and they relate to materials as Durometer type "A" is for the Shore Hardness of soft rubbers and plastics, Durometer type "D" is for the Shore Hardness of hard rubber and plastics and Durometer type "00" is for the Shore Hardness of sponges and foam. In one preferred embodiment, the first material is a harder material with a Shore D Hardness between 80 and 85 and the second material is a softer material with a Shore A Hardness between 60 and 70. In a presently particularly preferred embodiment, the first material is a transparent thermoplastic polyamide produced by EMS-Chemie, having a hardness of between 80 and 85 Shore D. The first material can be overmolded with a second, softer material, having a hardness of between 60 and 70 Shore A. In a preferred embodiment, the second material is a rubber. In an alternative embodiment, colorants are added to the first material and/or to the second material to control the color of the temple.

In a preferred embodiment, the temple substrate material is made of a thermoplastic material, such as nylon, which helps the temple withstand extreme climate conditions. In a presently particularly preferred embodiment, the nylon material used is Grilamid TR 55 or Grilamid TR 90 manufactured by EMS-GRIVORY, a unit of EMS-CHEMIE AG, which is based in Switzerland and Sumter, S.C. A nylon material has stronger thermal and mechanical properties than many other materials used for sunglass manufacturing. This is important because eyeglasses and sunglasses can be subjected to extreme climate conditions ranging from approximately −20° C. to approximately 110° C. and need to be able to retain their shape.

As mentioned previously, the disclosed temples are produced by shot-injection molding, an efficient process for producing plastic parts in high volume, followed optimally by overmolding a second material. For a temple intended to be over modeled, the injected part or the temple is preferably designed so that a portion or portions of the temple surface are configured to accommodate the overmolded second material. In an embodiment shown in FIG. 2A, a Section A-A taken from FIG. 2, temple substrate material 2 has been designed to have a trough or indent 3 provided within it along the interior of the temple for receiving the second material. The trough can be of any size, shape or length along the temple. The second material preferably does not exceed 60% of the surface area of the temple and could cover as little as 5% of the area of the temple.

After a temple configuration is designed, molds or dies are made by a mold or tool maker from metal and precision-machined to form the features of the temple. Molds are typically constructed from hardened steel, pre-hardened steel, aluminum, and/or beryllium-copper alloy. The material used to build a mold is usually based on the cost of the mold. In general, steel molds cost more to construct, but have a longer lifespan. As mentioned above, there are generally two types of steel molds: pre-hardened steel and hardened steel. Pre-hardened steel molds are less wear-resistant and are used for lower volume requirements or larger components. The typical steel hardness is about 38-45 on the Rockwell-C scale. Hardened steel molds are heat treated after machining and have superior wear resistance and lifespan. Typical hardness ranges for hardened steel molds are between about 50 and about 60 Rockwell-C (HRC). Aluminum molds can cost substantially less, and, when designed and machined with modern computerized equipment, can be economical for molding tens or even hundreds of thousands of parts. Beryllium copper is used in areas of the mold that require fast heat removal or areas that see the most shear heat generated.

In a preferred embodiment, the molds used are made from hardened steel. The molds can be manufactured either by CNC machining or by using electrical discharge machining processes. The mold is preferably produced using CNC machining because it provides greater precision than electrical discharge machining processes.

A temple mold preferably has two halves, each of which is attached inside the injection molding machine. One mold half, known as the first half or the core, remains stationary throughout the molding process. The other half, known as the second half or the cavity, is allowed to slide so that the mold can be opened and closed along the mold's parting line. A mold also has two main components, a mold core that forms the internal cavities in the mold and the mold cavity that determines the shape of the temple. When the mold is closed, the space between the mold core and the mold cavity forms a space in the shape of the desired part, in the case, an eyeglass temple. Multiple-cavity molds can be used, in which the two mold halves form several identical part cavities.

Figure 12:
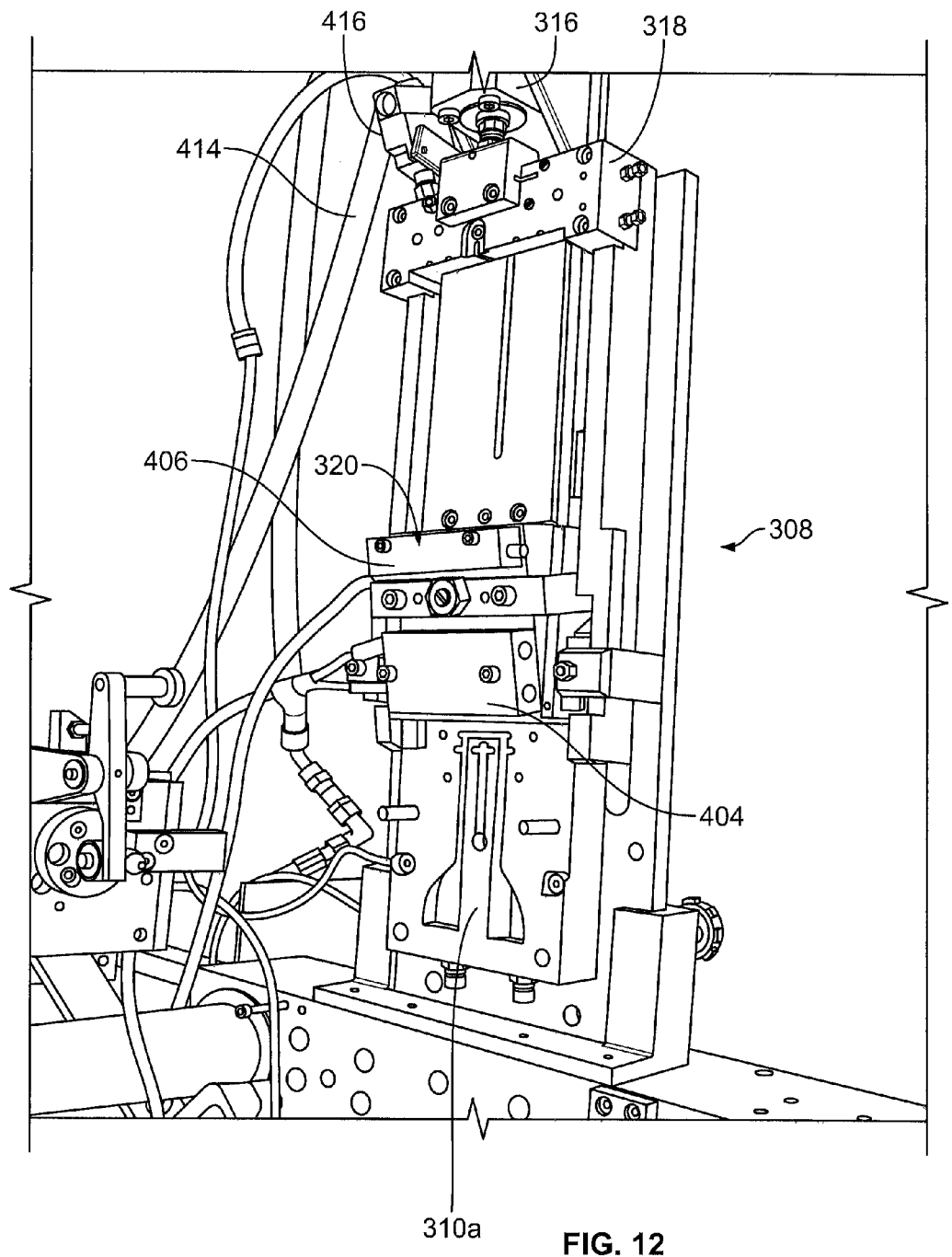
FIG. 12 is a partial side perspective view of the injection molding machine of FIG. 12 showing additional details of the auxiliary system.

Once the temple mold has been created and the material selected, the disclosed temple is produced by shot-injection molding. Injection of temple substrate material into the mold is preferably performed using an injection molding machine, as shown in FIGS. 11 and 12. In a preferred embodiment, a BILLION 90 T injection molding machine is used. The injection molding machine 300 has a hopper 302 used to supply the selected temple substrate material, usually in the form of pellets, to an injection system 304. The injection system comprises a barrel 306 that supports an internal reciprocating plasticizing screw. The reciprocating plasticizing screw compresses, melts and conveys the material. The reciprocating plasticizing screw generally has flights (not shown), the depth of which decreases from the hopper to the beginning of an auxiliary system 308. The flights compress the material against the inside diameter of the barrel, creating viscous or shear heat, which is primarily responsible for melting the material. The reciprocating plasticizing screw is also heated by electric heater bands (not shown), which are usually located outside the barrel and help maintain the material in a molten state. The reciprocating plasticizing screw also functions as a plunger and moves the molten substrate material forward through a nozzle (not shown) into a mold comprising two mold halves 310a and 310b. The mold is mounted on two platens (not shown). The first half of the mold or the mold core 310a is mounted on a stationary platen which generally houses the nozzle. Mold core 310a is preferably located under the auxiliary system 308. The second half of the mold or the mold cavity 310b is mounted on the moveable platen which is mounted on clamping system 311. An ejection system (not shown) is mounted to the moving platen. The two platens are typically connected by tie bars. The clamping system uses hydraulics to open and close the two halves of the mold 310a and 310b and build and hold the clamping tonnage. Additionally, the auxiliary system 308 is attached above the stationary platen is used to co-inject the wire core into the mold containing the molten material. In a presently preferred embodiment, a horizontal injection molding machine is used to perform a first injection of molten temple substrate into the mold to partially fill the mold and in an amount sufficient to support a wire core within it without need for any external support or contact with the mold sidewalls, followed by a shot-injection of a selected wire core, followed by injection of a second amount of molten substrate sufficient to completely surround the wire core, fill and pack the mold without undue overflow. The substrate is allowed to cool and harden in the mold into the desired temple configuration having an entirely encased wire core. The injection molding machine preferably has a clamping force of about 90 tonnages and is preferably controlled by an electronic control device that allows use of precise molding parameters. Either a horizontal or vertical injection molding machine can be used for the overmolding of the second material on the temple. In a preferred embodiment, a vertical injection molding machine is used to overmold the second material on the temple.

The process cycle for injection molding is very short, typically between 2 seconds and 2 minutes, and consists of four stages. A preferred embodiment requires approximately 2 minutes to finish one complete molding cycle, including the time required to manually feed the wire core into the auxiliary system for preceding shots. It is contemplated that automatic wire core feed could be utilized to further shorten the cycle time.

The first stage for injection molding is clamping. If a two piece mold is utilized, prior to the injection of the temple substrate material into the mold, the two halves of the mold must first be securely closed by the clamping system. As described above, each half 310a and 310b of the mold is mounted onto a platen on the injection molding machine. One half of the mold, here 310a is mounted on a stationary platen. The second half of the mold, here 310b, is mounted on the moveable platen and allowed to slide. The hydraulically powered clamping system pushes the second half of the mold toward the first half of the mold and exerts sufficient force to keep the mold securely closed while the molten material is injected. The time required to close and clamp the mold depends on the machine. Generally, larger machines having greater clamping forces require more time. This time can be estimated from the dry cycle time of the machine.

The second stage of the temple substrate material injection molding process is feed of molten temple substrate into the temple mold. During injection, the raw material, usually in the form of pellets, is fed into the injection molding machine's injection system. As mentioned previously, the temple substrate material is melted into a flowable or molten state by the injection system by the shear heat created by the screw and maintained by the heater bands. A shot of the molten temple substrate material is then injected into the mold very quickly through a nozzle located adjacent a passage or channel leading into the mold cavity and downstream from the end of barrel 306 and the heater bands. The buildup of pressure from the rapid injection helps hold the molten material in the mold. The amount of material that is initially injected is referred to as the first shot. The first shot injection time and amount can be determined by varying the amount of selected substrate and temperature in a process known as cycle tuning. The cycle tuning also includes evaluating the wire core during and after shot injection and adjustments to the core or material or amounts and temperatures to prevent breakage or deformation of the core, and evaluation of the finished temple to ensure that the temple is free from defects such as sink marks and bubbles. The total injection time can be estimated by the mold volume, shot volume, injection pressure, and injection power. It is preferred that the initial shot volume be adjusted so that the mold is not completely filled, to permit displacement of some substrate when a wire core is inserted, as set out below. This prevents waste of substrate and lessens machine cleaning time. It has been found that initial shot volume sufficient to fill about 40% to about 90% of the mold and more preferably about 60% to about 80% is desirable. These ranges enable shot-injection of the wire core into the mold and molten selected temple substrate material to a depth that does not pass the end of the wire core completely through the substrate to the end of the mold, but also enables the wire core to be supported by the substrate without the need for external supports. In a preferred embodiment, the initial shot volume is 30 cm$^3$, the injection pressure is approximately 50 to 65 bars, and the injection power is approximately 30 bars.

During the wire core shot-injection stage, the wire core is injected into the molten temple substrate material within the mold so that it is surrounded by the material around a first portion of the wire core and supports the core within the material and without contact of the core with the mold or any other external support. The wire core can be made of any suitable material having sufficient rigidity to prevent distortion during the initial shooting process. In a preferred embodiment, the wire core is made of hard stainless steel. The diameter of the wire core is preferably between 0.5 mm to 2.5 mm. In a preferred embodiment, the wire core has a diameter of 1.4 mm and an overall length of about 80 mm. The length of the wire core depends on the size of the desired temple. In a preferred embodiment, the ends of a wire core encased in the temple are 10 mm to 15 mm from each end of the temple. Shot-injection of the wire core into the temple substrate must be done while the injected substrate material is still in at least a semi-molten state within the partially filled mold to minimize wire core breakage and permit good penetration and accurate positioning of the core. The length of the wire core and the viscosity of the molten temple substrate can be selected to help ensure that the wire core reaches its desired position within the temple mold without coming into contact with the mold or penetrating through all of the substrate material.

The shot-injection of the wire core is performed by auxiliary system 308 shown in FIGS. 11 and 12, which is specially designed to carry out this function. The auxiliary system is attached to the fixed platen of the injection machine, which is set up with uncommon molding sequences. The molding sequences are uncommon because they contain additional steps to allow for the insertion of the wire core, such as depressurizing the clamping cylinder, shot-injecting the wire core and repressurizing the clamping cylinder. The auxiliary system comprises a flat box shaped metal block 316 that, as shown in FIGS. 11 and 12, also comprises a limit switch 416 and a hydraulic cylinder 314 and hydraulic lines 414 for driving a wire core driving carriage 318 down toward the wire core feeder 320 to shoot the wire cores into the molds. The temple mold 310*a* and 310*b* is held at the bottom of the auxiliary system.

In a preferred embodiment, auxiliary system 308 is 650 mm tall. The wire core driving carriage 318 is located at the uppermost portion the auxiliary system 308 and is 200 mm wide. The distance between the top of the wire core driving carriage 318 and the top of the wire core feeder 320 is 285 mm. The wire core driving carriage 316 preferably has at least two rigid pins approximately 1.5 mm in diameter and approximately 200 mm in length that are driven by hydraulic cylinder 314 to shoot two wire cores into a mold for a pair of temples. In a particularly preferred embodiment, the wire core driving carriage 318 has four rigid pins for shooting four wire cores into a mold for two pairs of temples. The hydraulic cylinder 314 is used to drive the pin against the wire core held in the wire core feeder 320, causing the wire core to shoot or be co-injected into the mold containing semi-molten or molten material. The hydraulic cylinder 314 preferably has a maximum pressure of 30 bars.

In a preferred embodiment, the wire core feeder 320 is 140 mm wide and 135 mm in height and has four internal 1.5 mm diameter passages for holding four wire cores to be injected into a temple mold. The wire core feeder has two heating elements 404 and 406, one at the top and one at the bottom. The heating elements heat the wire core to facilitate its injection into the material in the mold. The temperature to which the wire core is heated depends on the desired thickness of the final temple and the temple substrate material being used, although it is typically between about 240° C. and 280° C.

The temple mold 310*a* and 310*b* is moved into its closed position and is held in place below wire core feeder 320. In a preferred embodiment, the temple mold is 155 mm wide and 185 mm in height. In a particularly preferred embodiment, the temple mold is designed to produces two pairs of temples.

To allow for the displacement of semi-molten or molten material caused by the shot-injection of the wire core, the mold cannot be completely filled when the wire core is injected. In a preferred embodiment, between about 40% to about 90%, more preferably from about 60% to 80% of the mold is filled by the first shot of molten substrate material, with an amount of about 70% to about 80% being presently preferred. The first shot injection is made by partially filling the mold cavity at a fast filling rate without packing the material prior to injection of the wire core to allow for adequate displacement when the first portion of wire core is inserted but avoiding undue displacement and overly wasteful loss of material by overflow out of the mold. In a particularly preferred embodiment, this first shot injection takes from 3 to 5 seconds. After a few seconds, the clamping cylinder is depressurized, allowing the auxiliary system to shoot the preferably heated wire core into the molten temple substrate in the mold along center parting line of the mold. Shooting the wire core into the material along center parting line helps guide the wire core into the center of the molten temple substrate, and the molten substrate closes around the core and supports the core in the desired position as the pin is withdrawn. As shown in FIG. 1, wire core 8 is positioned so that its ends are spaced inward from temple end 6 and temple tip 4. In a particularly preferred embodiment, the wire core 8 is at a position such that its opposite ends are approximately 5 mm from tip of the temple 1 and approximately 10 mm from the temple end. This position allows the wire core to maintain a good head curl and ear tip adjustment for better comfort and fit. The position of the wire core is determined in part by adjusting the position of the pin in the auxiliary system. After the wire core is injected into the partially filled mold, the mold is re-clamped and pressurized, followed by a second injection stage comprising complete filling of the mold with additional sufficient amounts of molten temple substrate to pack the mold and bring the material into close contact with the entire surface of the wire core, and to provide sufficient amounts of material to accommodate for expected shrinkage as explained below. This process permits rapid production of the template without the need for manual positioning of the wire core, and avoids formation of bubbles or gaps in substrate material around the wire core that can occur if an external support is needed and must be withdrawn before substrate cooling. Use of two shots of the same temple substrate material also helps ensure that a strong integral template is formed during cooling.

After shot-injection of the wire core and complete mold filling, the third stage of the injection molding process, cooling, begins. The molten substrate material that is inside the mold will begin to cool as soon as it makes contact with the interior mold surfaces. As the material cools, it will solidify into the shape of the temple by conforming to the mold configuration. However, during cooling some shrinkage of the temple material may occur. Packing of material in the second shot of the injection stage has been found to be desirable as it allows additional material to flow into the mold and brings the material into close contact with the wire core's surface, minimizing bubbles and gaps and reducing the amount of visible shrinkage after final hardening of the temple. The mold cannot be opened until the required cooling time has elapsed. The cooling time can be estimated from several thermodynamic properties of the material and the maximum wall thickness of the part. In particular, the mold surface temperature is of critical importance when determining the cooling time. In general, the higher the temperature of the mold and its surface, the longer the cooling time. In a preferred embodiment, the cooling time is 20 seconds using air cooling. If rubber is the material being used, the mold can be cooled by a closed circuit of cold water. The cooling time is preferably at least approximately 10 to 15 seconds to prevent distortion of the molded temple.

The fourth and final stage of the injection molding process is removal of the solidified temple from the mold. After sufficient time has passed, the cooled temple may be removed from the mold manually, or more preferably, it can ejected from the mold by the ejection system, which is attached to the moveable platen. When the mold is opened, the mold ejection system uses a mechanical mechanism to push the temple out of the mold. Force must be applied to eject the temple because during cooling the temple shrinks and adheres to the mold. In order to facilitate the ejection of the temple, a mold release agent can be sprayed onto the surfaces of the mold prior to injection of the material. In a preferred embodiment, Baysilone® Release Agent M manufactured by Bayer is used as a mold release agent. The time that is required to open the mold and eject the temple can be estimated from the dry cycle time of the machine and should include time for the part to fall free off of the mold. In a preferred embodiment, the dry cycle time is approximately 90 to 120 seconds. Once the temple is ejected, the mold can be clamped shut for the next shot to be injected.

After the temple is removed from the mold, some post processing of the temple is typically required. During cooling, the material in the channels of the mold can solidify and attach to the temple. This excess material, along with any flash that has occurred, can be trimmed from the temple, typically by using cutters. Once the excess material and/or flash has been removed, the temple can be tumbled and polished to remove any surface blemishes resulting from the injection process. The temple can also optionally be decorated using a varnish which is typically sprayed. In a preferred embodiment, polyurethane lacquer is used. In a particularly preferred embodiment, 2007643C Shining Paint manufactured by Vernici Caldart in Bellusco, Italy is used.

After the temple has been formed, or after the finished temple has been polished and coated with an optional varnish spray decoration, it may be overmolding with another material. As shown in FIGS. 1, 2 and 2A, a groove or channel 3 may be molded into the inside of temple 1 to facilitate placement and affixing of the overmolded material along the portion of the temple likely to be in contact with the wearer's head.

The overmolding process begins by placing the pre-made reinforced temple into a second mold and clamping the second mold into an injection molding machine. This second mold is designed to hold the temple so that only the portions of the temple exposed to the mold cavity are overmolded with a second material. The glass transition temperature of the second material is preferably selected to be slightly higher than that of the temple substrate material to melt the surface of the hardened temple substrate material in order to create a good bond between it and the second materials. In a preferred embodiment, the second material is a soft rubber that is heated and injected into the second mold. The second material is preferably designed by the same manufacturer as the temple substrate material to ensure compatibility between the materials. In an alternative embodiment, colorants are added to the second material to control the color of this portion of the temple.

Once the second material has been injected into the second mold and packed, the cooling cycle begins. When the temple has cooled it is manually removed or mechanically ejected from the mold and the temple is ready for post molding operations with the temple substrate and second material thermally bonded together. This produces a temple using an efficient manufacturing system that can be self-adjusted. Additionally, the portions of the resulting temple that rest along the mastoid bone structure and other portions of a wearer's head are more comfortable, since a softer, second material has been overmolded on the temple.

As shown in FIGS. 1 and 2, end portion 4 of temple 1 may be provided with an outwardly extending portion 10 for use in pilotable attachment of the temple to an eyeglass lens support frame by well-known means. FIG. 4A shows a plastic hinge 14 affixed to end portion 4 of the temple for such pivoting attachment. Plastic hinge 14 can be molded during the injection molding process used to make the temple by providing an appropriate cavity in the mold, or can be added after template manufacture by use of adhesives or screws known in the art. FIGS. 6 and 7 show alternative metal hinge 114 affixed near end portion 104 of reinforced temple 100 by insertion molding during the first shot injection step and is typically located on the wearer side of the temple. FIGS. 3, 3A and 4B also show the interior of temple 1 shown in FIGS. 1, 2 and 2A that has been overmolded with a second material 12 that covers the total interior area of temple that rests along the mastoid bone structure of a wearer. FIG. 3A is a section view taken along section B-B of FIG. 3 and shows how the second material 12 has filled in trough 3 shown in FIGS. 2 and 2A and overlays the temple substrate material on the interior or wearer's side of the temple. FIG. 4A shows reinforced temple of FIG. 1, FIG. 4B is a top view of the temple in FIG. 3, which shows temple 1 of FIGS. 1, 2 and 4a with the second material 12 added along the interior of the temple.

FIGS. 5, 6 and 6A show the exterior of an alternative embodiment of a temple 100, including the first material 102, temple end 104, temple tip 106, and wire core 108 and metal hinge 114. FIGS. 6 and 6A show the interior of the temple of FIG. 5, including a second material 112 located within groove 103. FIG. 7 is a top view of the temple shown in FIG. 6 showing the location of hinge 114.

FIG. 8 shows the exterior of a further alternative embodiment of a temple 200 made of a first material 202, a plastic integrated hinge 210 located at temple end 204, temple tip 206, and wire core 208 that only has a portion of the inner side of temple 200 designed for receiving the second material 212. FIGS. 9 and 9A show an interior view of the temple 200 of FIG. 8, including a second material 212 located within a groove 203 supplied in material 202 in which a groove is only in a portion of the interior surface of the temple. FIG. 10 is a top view of the temple of FIG. 9 showing integrated plastic hinge 214 located on temple end 204 of temple 200. Plastic hinge 214 may be formed during temple injection molding process by providing an additional cavity in the mold which cavity is configured to provide the desired hinge when filled with the first shot of temple substrate material.

While various embodiments have been described, it will be apparent to those of ordinary skill in the art that many more embodiments and implementations are possible within the scope of the invention. Accordingly, the invention is not to be restricted except in light of the attached claims and their equivalents.

What is claimed is:

1. A process for producing a shot-injection molded reinforced eyeglass temple, comprising:
    providing a mold for an eyeglass temple;
    injecting a first shot of a molten temple substrate material in an amount and viscosity sufficient to partially fill the mold and sufficient to support a selected wire core within the material and not in contact with the mold;
    shot-injecting the wire core into the mold and the molten temple substrate material so that a first portion of the core extends into and is supported in a desired position within the mold solely by the molten material;
    injecting a second shot of the molten temple substrate material to completely fill the mold and to bring the material into contact with the entire surface of the wire core and completely surround the wire core;
    allowing the temple substrate material containing the wire core to cool and solidify; and
    removing from the mold an eyeglass temple having an entirely encased wire core.

2. The process of claim 1 further comprising removing excess material from the ejected eyeglass temple and polishing the eyeglass temple.

3. The process of claim 1 further comprising coating the eyeglass temple with a varnish spray decoration.

4. The process of claim 1 wherein the temple substrate material is a thermoplastic material.

5. The process of claim 1 wherein the mold is partially filled to about 40% to about 90% of its capacity.

6. The process of claim 1 wherein the mold is partially filled to about 60% to about 80% of its capacity.

7. The process of claim 1 wherein the wire core is made of stainless steel.

8. The process of claim 1 wherein the wire core has a diameter between 0.5 mm and 2.5 mm.

9. The process of claim 1 wherein the injection molding machine is a horizontal injection molding machine.

10. A shot-injection molded eyeglass temple produced by the process of claim 1.

11. The process of claim 1 further comprising:
    providing a second mold for overmolding a second material on a portion of the eyeglass temple;
    providing the eyeglass temple into the second mold;
    injecting a shot of the second material to fill the second mold;
    allowing the second material to cool and solidify;
    ejecting an eyeglass temple having an encased wire core that is partially overmolded with the second material.

12. The process of claim 11 wherein the second material has a lower Shore Hardness than the first temple substrate material.

13. The process of claim 11 wherein the second material is a soft rubber material.

14. A system for shot-injection molding a reinforced eyeglass temple having a wire core, comprising:
    an eyeglass temple mold;
    an injection molding system for holding the mold in a desired position for accepting of a molten temple substrate material comprising a temple substrate supply system, a temple substrate heating system for heating temple substrate material to a molten condition and an injection means for injecting the molten temple substrate material into the temple mold in at least a first shot portion and a second shot portion; and
    an auxiliary system positioned adjacent the held mold and comprising at least one passage for feeding and aligning a wire core, and a means for shot-injecting the wire core from the passage into the mold and the first shot of the molten temple substrate material at a position wherein the first portion of the wire core will be positioned within the mold and the first shot portions of the injected temple substrate material without contacting the sides of the mold or other external support during the shot injections and cooling of the molten temple substrate material.

15. The system of claim 14 further comprising:
    an eyeglass mold having a first half and a second half;
    an injection molding system comprising a stationary platen on which the first half of the mold is mounted, a moveable platen on which the second half of the mold is mounted; and
    an auxiliary system mounted on the stationary platen and comprising a metal block having at least one internal passage for feeding and aligning a wire core, at least one pin that fits inside the internal passage, and a hydraulic cylinder for driving the pin against the wire core to shot-inject the wire core from the passage into the mold and the first shot of the molten temple substrate.

16. The system of claim 14 further comprising:
    a second mold for overmolding a second material on a portion of the eyeglass temple; and
    a second injection molding machine for injecting the second material into the second mold and onto the eyeglass temple.

17. A system of claim 14 further comprising:
    a cooling system for cooling and solidifying the molten temple substrate within the temple mold after the second injection of molten temple substrate material.

18. A process for producing an eyeglass temple shot-injection molded with a reinforcing wire core, comprising:
    providing a mold for any eyeglass temple having a first half and a second half;
    mounting the mold on an injection molding machine comprising a stationary platen on which the first half of the mold is mounted and a moveable platen on which the second half of the mold is mounted, an injection system, an auxiliary system and an ejection system;
    closing the mold so that the first half and the second half of the mold are in contact with each other;
    supplying a temple substrate material into the injection system;
    heating the temple substrate material in the injection system until the material becomes molten;
    injecting a first shot of the molten temple substrate material into the closed mold using the injection system to partially fill the mold in an amount of between about 40% to about 90% of the mold's capacity;
    shot-injecting a wire core into the mold so that a first portion of the core is located within and supported solely by the molten temple substrate material using an auxiliary system mounted on the stationary platen of the injection molding machine;
    injecting at least a second shot of additional molten temple substrate material into the mold containing the wire core using the injection system to completely fill the mold bring the material into close contact with and to completely surround the wire core;

allowing the temple substrate material containing the wire core to cool and solidify in the mold;

opening the mold by separating the first half and second half of the mold from each other;

ejecting from the mold a reinforced temple containing an encased wire core using an ejection system mounted on the mold or the injection molding machine;

inserting the reinforced temple into a second mold designed for overmolding a second material on at least a portion of the surface of the temple;

mounting the second mold on an injection molding machine comprising an injection system and an ejection system;

feeding the second material into the injection system;

heating the second material in the injection system until it becomes molten;

injecting the molten second material into the second mold to bring it into contact with at least a portion of the temple surface;

allowing the second material to cool and solidify;

removing from the second mold a temple containing an encased wire core that is overmolded on at least a portion of its surface with the second material.

19. A process according to claim 18, wherein the second material has a Shore Hardness less than that of the first temple substrate material.

20. A process according to claim 18, wherein the temple substrate material has a Shore D Hardness of between about 80 to about 85 and the second material has a Shore A hardness of between about 60 to about 70.

* * * * *